(12) United States Patent
Chen et al.

(10) Patent No.: US 10,705,315 B2
(45) Date of Patent: Jul. 7, 2020

(54) SLIM LENS ASSEMBLY (71) Applicants: Sintai Optical (Shenzhen) Co., Ltd., ShenZhen, Guangdong Province (CN); Asia Optical Co., Inc., Taichung (TW)

(72) Inventors: Chien-Hung Chen, Taichung (TW); Hsi-Ling Chang, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 58 days.

(21) Appl. No.: 15/972,348

(22) Filed: May 7, 2018

(65) Prior Publication Data
US 2019/0056564 A1   Feb. 21, 2019

(30) Foreign Application Priority Data
Aug. 17, 2017   (CN) .......................... 2017 1 0706028

(51) Int. Cl.
G02B 9/34      (2006.01)
G02B 13/00     (2006.01)

(52) U.S. Cl.
CPC ............. G02B 9/34 (2013.01); G02B 13/004 (2013.01); G02B 13/005 (2013.01)

(58) Field of Classification Search
CPC ....... G02B 9/34; G02B 13/004; G02B 13/005
USPC ................................. 359/715, 753, 771, 772
See application file for complete search history.

(56) References Cited

U.S. PATENT DOCUMENTS 3,941,457 A * 3/1976 Kawakami ............. G02B 13/24
                                                        359/772

* cited by examiner

Primary Examiner — William Choi
(74) Attorney, Agent, or Firm — McClure, Qualey & Rodack, LLP (57) ABSTRACT A slim lens assembly in accordance with the invention in order from an object side to an image side along an optical axis, comprises a first lens, a second lens, a third lens and a fourth lens. The first lens is with positive refractive power, which includes a convex surface facing an image side. The second lens is with positive refractive power, which includes a concave surface facing the image side. The third lens is with positive refractive power, which includes a concave surface facing the object side and a convex surface facing the image side. The fourth lens is with positive refractive power.

20 Claims, 8 Drawing Sheets

SLIM LENS ASSEMBLY

BACKGROUND OF THE INVENTION

Field of the Invention

The invention relates to a slim lens assembly.

Description of the Related Art

In recent years, the development trend of the slim lens assembly, in addition to the miniaturization and high-resolution continue to develop, following the different application needs, it has to ability to resist environmental temperature changes, the slim lens assembly of well-known cannot satisfy a requirement of the present. Therefore, a slim lens assembly needs a new structure to meet the needs of miniaturization, high resolution, and environmental temperature resistance.

BRIEF SUMMARY OF THE INVENTION

The invention provides a slim lens assembly to solve the above problems. The slim lens assembly of the invention, provided with characteristics of a shortened total lens length, high resolution, resists environmental temperature changes, and still has a good optical performance.

The slim lens assembly in accordance with the invention in order from an object side to an image side along an optical axis, comprises a first lens, a second lens, a third lens and a fourth lens. The first lens is with positive refractive power, which includes a convex surface facing an image side. The second lens is with positive refractive power, which includes a concave surface facing the image side. The third lens is with positive refractive power, which includes a concave surface facing the object side and a convex surface facing the image side. The fourth lens is with positive refractive power.

In accordance with the invention in order from an object side to an image side along an optical axis, comprises a first lens, a second lens, a third lens, an aperture stop and a fourth lens. The first lens is with positive refractive power, which includes a convex surface facing an image side. The second lens is with positive refractive power, which includes convex surface facing an object side and a concave surface facing the image side. The third lens is with positive refractive power, which includes concave surface facing an object side and a convex surface facing the image side. The fourth lens is with positive refractive power.

In accordance with the invention, the first lens includes a convex surface facing the object side, a composite focal length of the second lens element, the third lens element and the fourth lens element is $f_{234}$, the following condition can be satisfied: $f_{234}>0$.

In accordance with the invention, the slim lens assembly further includes a stop disposed between the third lens and the fourth lens.

In accordance with the invention, the first lens includes a convex surface facing the object side.

In accordance with the invention, the fourth lens includes a convex surface facing the object side and a concave surface facing an image side.

In accordance with the invention, the slim lens assembly further comprises an electronic sensor on which an object is imaged. The distance on the optical axis between the stop and the electronic sensor is SL, the distance on the optical axis between the object-side surface of the first lens and the electronic sensor is TTL, and they satisfy the relation: $0.3<SL/TTL<0.8$.

In accordance with the invention, a composite focal length of the second lens element, the third lens element and the fourth lens element is $f_{234}$, the focal length of the fourth lens is $f_4$, the following condition can be satisfied: $0<f_{234}/f_4<1$.

In accordance with the invention, the focal length of the first lens element is $f_1$, the focal length of the second lens element is $f_2$, the focal length of the third lens element is $f_3$, the focal length of the fourth lens element is $f_4$ and they satisfy the relations: $0<(f_1+f_3)/(f_2+f_4)<10$.

In accordance with the invention, the radius of curvature of the image-side surface of the first lens is $R_{12}$, the focal length of the first lens element is $f_1$, and they satisfy the relations: $R_{12}/f_1<0$.

In accordance with the invention, a composite focal length of the second lens element, the third lens element and the fourth lens element is $f_{234}$, the focal length of the fourth lens is $f_4$, the following condition can be satisfied: $0<f_{234}<30$.

In accordance with the invention, the slim lens assembly further comprises an electronic sensor on which an object is imaged. The distance on the optical axis between the stop and the electronic sensor is SL, the distance on the optical axis between the object-side surface of the first lens and the electronic sensor is TTL, and they satisfy the relation: $0.3<SL/TTL<0.65$.

In accordance with the invention, the radius of curvature of the image-side surface of the first lens is $R_{12}$, the focal length of the first lens element is $f_1$, and they satisfy the relations: $-30<R_{12}/f_1<0$.

A detailed description is given in the following embodiments with reference to the accompanying drawings.

BRIEF DESCRIPTION OF THE DRAWINGS

The invention can be more fully understood by reading the subsequent detailed description and examples with reference made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
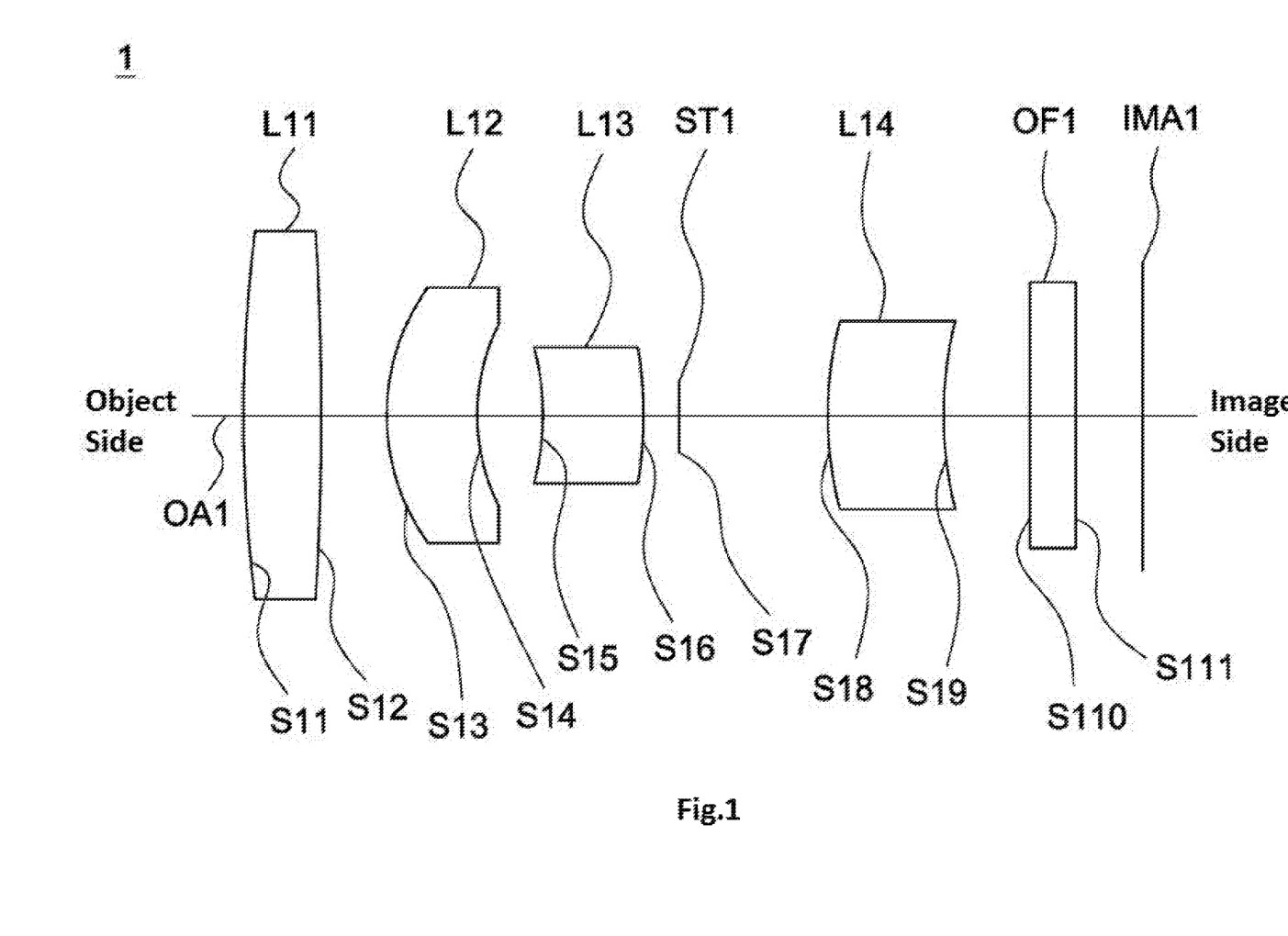
FIG. 1 is a lens layout diagram of a slim lens assembly in accordance with a first embodiment of the invention.

Referring to FIG. 1, FIG. 1 is a lens layout diagram of a slim lens assembly in accordance with a first embodiment of the invention. The slim lens assembly 1 in order from an object side to an image side along an optical axis OA1, comprises a first lens L11, a second lens L12, a third lens L13, an aperture stop ST1, a fourth lens L14 and an optical filter OF1. In operation, an image of light rays from the object side is formed at an image plane IMA1.

The first lens L11 is a biconvex lens with positive refractive power. The first lens L11 is made of glass material, wherein the object side surface S11 is a convex surface, the image side surface S12 is a convex surface and both of the object side surface S11 and image side surface S12 are spherical surfaces.

The second lens L12 is a meniscus lens with positive refractive power. The second lens L12 is made of glass material, wherein the object side surface S13 is a convex surface, the image side surface S14 is a concave surface and both of the object side surface S13 and image side surface S14 are spheric surfaces.

The third lens L13 is a meniscus lens with positive refractive power. The third lens L13 is made of glass material, wherein the object side surface S15 is a concave surface, the image side surface S16 is a convex surface and both of the object side surface S15 and image side surface S16 are spheric surfaces.

The fourth lens L14 is a meniscus lens with positive refractive power. The fourth lens L14 is made of glass material, wherein the object side surface S18 is a convex surface, the image side surface S19 is a concave surface and both of the object side surface S18 and image side surface S19 are spheric surfaces.

Both of the object side surface S110 and image side surface S111 of the optical filter OF1 are plane surfaces.

In addition, the slim lens assembly 1 of the first embodiment at least satisfies one of the following conditions:

$$0 < (fl_1 + fl_3)/(fl_2 + fl_4) < 10 \quad (1)$$

$$fl_{234} > 0 \quad (2)$$

$$0 < fl_{234} < 30 \quad (3)$$

$$0 < fl_{234}/fl_4 < 1 \quad (4)$$

$$0.3 < SL1/TTL1 < 0.8 \quad (5)$$

$$0.3 < SL1/TTL1 < 0.65 \quad (6)$$

$$R1_{12}/fl_1 < 0 \quad (7)$$

$$-30 < R1_{12}/fl_1 < 0 \quad (8)$$

Wherein the focal length of the first lens L11 is $fl_1$, the focal length of the second lens L12 is $fl_2$, the focal length of the third lens L13 is $fl_3$, the focal length of the fourth lens L14 is $fl_4$. A composite focal length of the second lens element, the third lens element and the fourth lens element is $fl_{234}$. An electronic sensor on which an object is imaged, wherein a distance on the optical axis OA1 between the stop ST1 and the electronic sensor is SL1, the distance on the optical axis OA1 between the object-side surface of the first lens L11 and the electronic sensor is TTL1. The radius of curvature of the image-side surface S12 of the first lens L11 is $R1_{12}$.

By the above design of the lenses, the stop ST1 and at least satisfies one conditions, the slim lens assembly 1 is provided with a shortened total lens length, an effectively corrected aberration, an increased resolution and resist environmental temperature changes.

The slim lens assembly 1 in accordance with the FIG. 1 is provided with the optical specifications shown in Table 1. Table 1 shows that the effective focal length is equal to 9.021 mm, F-number is equal to 5.6 and total lens length is equal to 13.7974 mm and diagonal field of view is equal to 29 degrees for the slim lens assembly 1 of the first embodiment of the invention.

TABLE 1

| Surface Number | Radius of Curvature (mm) | Thickness (mm) | Nd | Vd | Remark |
|---|---|---|---|---|---|
| S11 | 22.8682 | 1.175146 | 1.6779 | 55.376 | The First Lens L11 |
| S12 | −41.6399 | 0.985161 | | | |
| S13 | 3.366453 | 1.433313 | 1.6779 | 55.376 | The Second Lens L12 |
| S14 | 3.396158 | 0.99141 | | | |
| S15 | −4.66826 | 1.557954 | 1.8466 | 23.78 | The Third Lens L13 |
| S16 | −4.9421 | 0.553154 | | | |
| S17 | ∞ | 2.265451 | | | Stop ST1 |
| S18 | 5.436383 | 1.783619 | 1.8466 | 23.78 | The fourth L14 |
| S19 | 6.147967 | 1.352228 | | | |
| S110 | ∞ | 0.7 | 1.5168 | 64.16734 | Optical Filter OF1 |
| S111 | ∞ | 1 | | | |

Table 2 lists some parameter and calculated values of the above conditions (1)-(8). According to the Table 2, the slim lens assembly 1 of the first embodiment satisfies the above conditions (1)-(8).

TABLE 2

| parameter | calculated values |
|---|---|
| $fl_1$ | 22.2362 mm |
| $fl_2$ | 28.3014 mm |
| $fl_3$ | 65.3002 mm |
| $fl_4$ | 26.783 mm |
| SL1 | 7.10 mm |
| TTL1 | 13.7974 mm |
| $R1_{12}$ | −41.6399 mm |
| $fl_{234}$ | 13.0613 mm |
| $(fl_1 + fl_3)/(fl_2 + fl_4)$ | 1.5891 |
| $fl_{234}/fl_4$ | 0.488 |
| SL1/TTL1 | 0.515 |
| $R1_{12}/fl_1$ | −1.8726 |

Figure 2A:
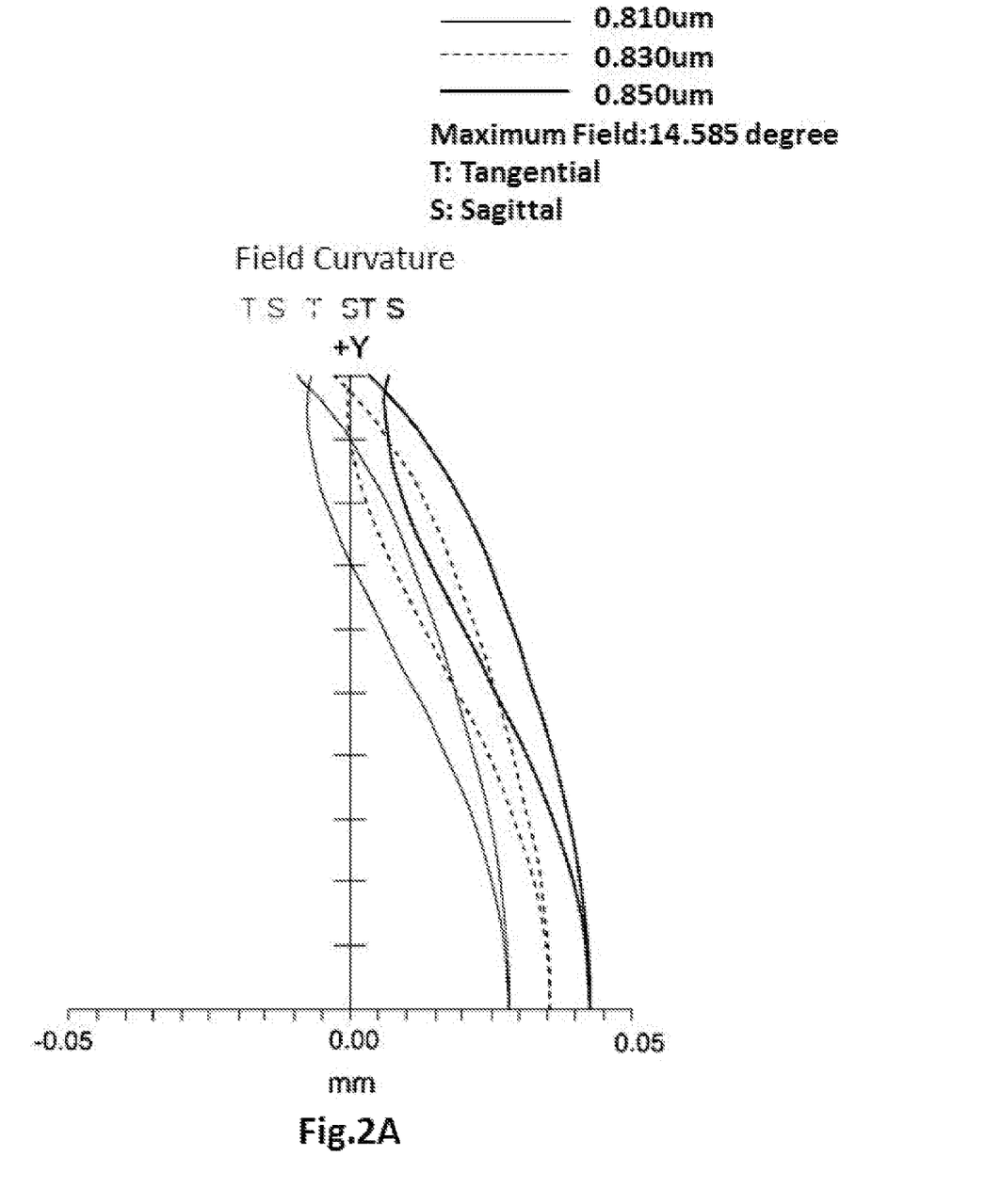
FIG. 2A is a field curvature diagram of the slim lens assembly in accordance with the first embodiment of the invention.
Figure 2B:
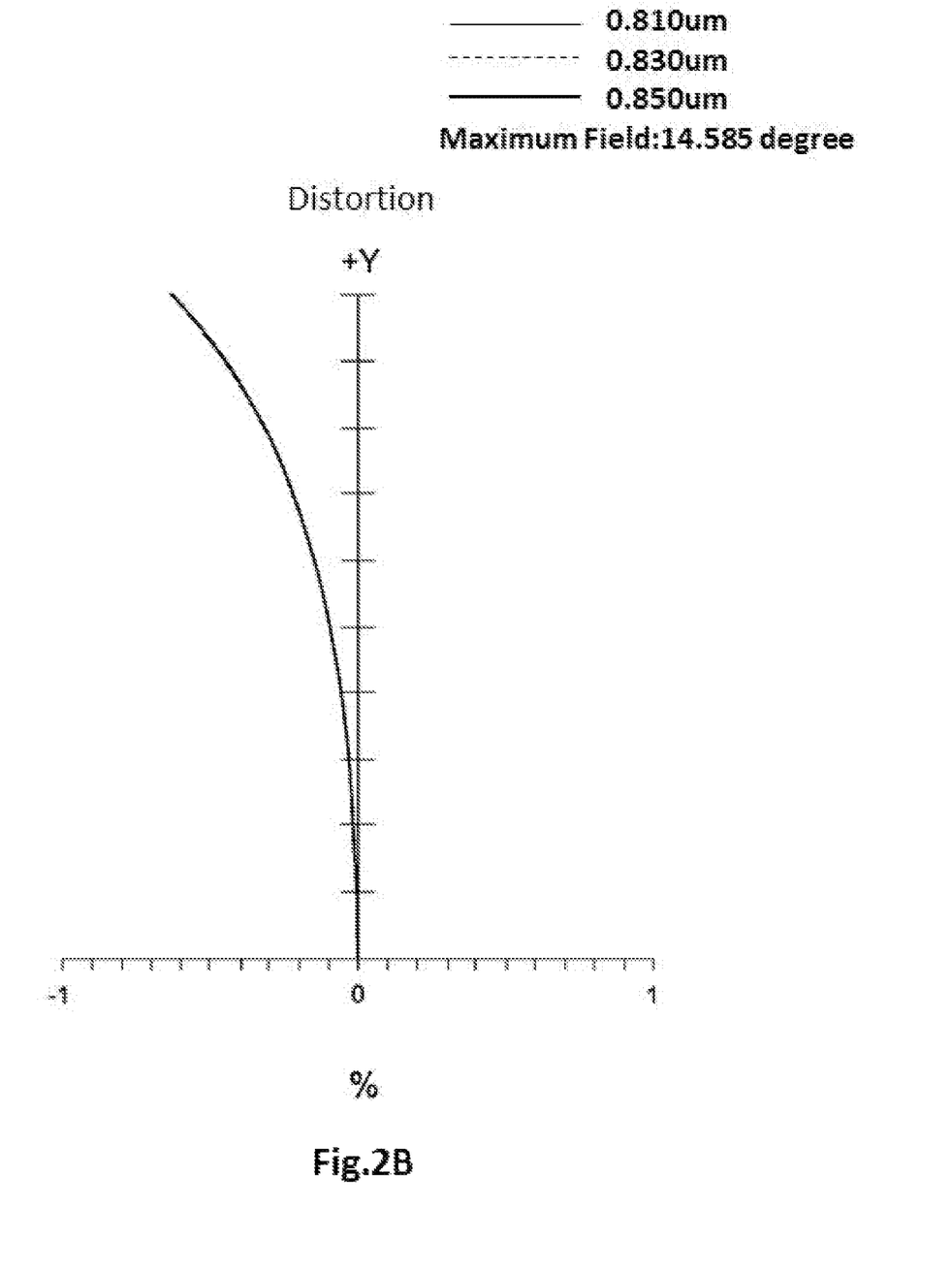
FIG. 2B is a distortion diagram of the slim lens assembly in accordance with the first embodiment of the invention.
Figure 2C:
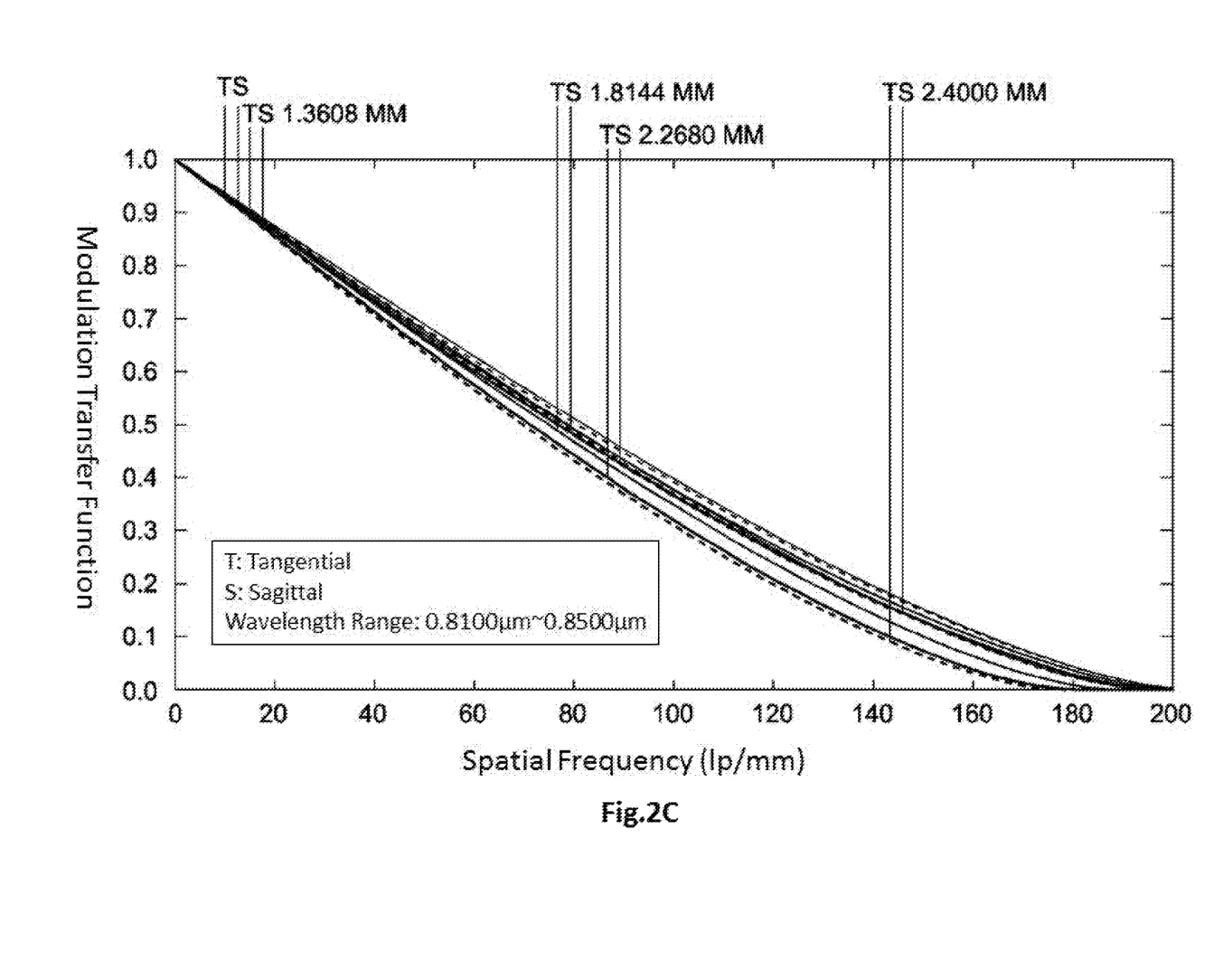
FIG. 2C is a modulation transfer function diagram of the slim lens assembly in accordance with the first embodiment of the invention.

The first embodiment can meet the requirements of optical performance as seen in FIGS. 2A-2C, wherein FIG. 2A shows the field curvature diagram of the slim lens assembly 1 in accordance with the first embodiment of the invention, FIG. 2B shows the distortion diagram of the slim lens assembly 1 in accordance with the first embodiment of the invention, FIG. 2C shows the modulation transfer function diagram of the slim lens assembly 1 in accordance with the first embodiment of the invention.

It can be seen from FIG. 2A that the field curvature of tangential direction and sagittal direction in the slim lens assembly 1 of the first embodiment ranges between −0.01 mm and 0.045 mm for the wavelength of 0.810 μm, 0.830 μm, 0.850 μm.

It can be seen from FIG. 2B (the three lines in the figure almost coincide to appear as if a signal line) that the distortion in the slim lens assembly 1 of the first embodiment ranges between −0.7% and 0% for the wavelength of 0.810 μm, 0.830 μm, 0.850 μm.

It can be seen from FIG. 2C that the modulation transfer function of tangential direction and sagittal direction in the slim lens assembly 1 of the first embodiment ranges from 0.0 to 1.0 wherein the wavelength ranges from 0.81 μm to 0.85 μm, the fields respectively are 1.3608 mm, 1.8144 mm, 2.2680 mm and 2.4000 mm, the spatial frequency ranges from 0 lp/mm to 200 lp/mm.

It is obvious that the field curvature and the distortion of the slim lens assembly 1 of the first embodiment can be corrected effectively, the lens resolution can meet the requirement. Therefore, the slim lens assembly 1 of the first embodiment is capable of good optical performance.

Figure 3:
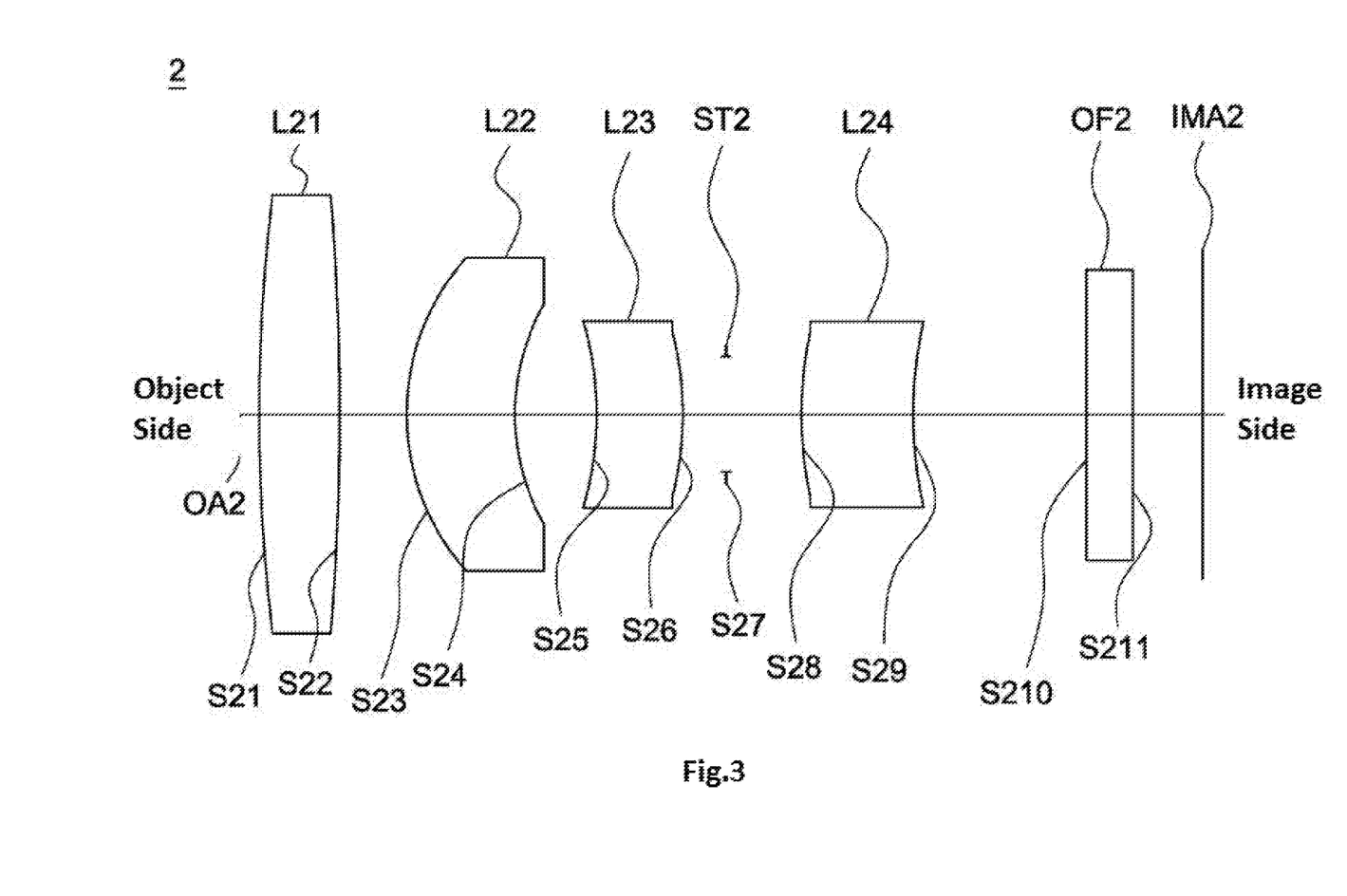
FIG. 3 a lens layout diagram of a slim lens assembly in accordance with a second embodiment of the invention.

Referring to FIG. 3, FIG. 3 is a lens layout diagram of a slim lens assembly in accordance with a second embodiment of the invention. The slim lens assembly 2 in order from an object side to an image side along an optical axis OA2, comprises a first lens L21, a second lens L22, a third lens L23, an aperture stop ST2, a fourth lens L24 and an optical filter OF2. In operation, an image of light rays from the object side is formed at an image plane IMA2.

The first lens L21 is a biconvex lens with positive refractive power. The first lens L21 is made of plastic material, wherein the object side surface S21 is a convex surface, the image side surface S22 is a convex surface and both of the object side surface S21 and image side surface S22 are aspherical surfaces.

The second lens L22 is a meniscus lens with positive refractive power. The second lens L22 is made of plastic material, wherein the object side surface S23 is a convex surface, the image side surface S24 is a concave surface and both of the object side surface S23 and image side surface S24 are aspheric surfaces.

The third lens L23 is a meniscus lens with positive refractive power. The third lens L23 is made of glass material, wherein the object side surface S25 is a concave surface, the image side surface S26 is a convex surface and both of the object side surface S25 and image side surface S26 are aspheric surfaces.

The fourth lens L24 is a meniscus lens with positive refractive power. The fourth lens L24 is made of plastic material, wherein the object side surface S28 is a convex surface, the image side surface S29 is a concave surface and both of the object side surface S28 and image side surface S29 are aspheric surfaces.

Both of the object side surface S210 and image side surface S211 of the optical filter OF2 are plane surfaces.

In addition, the slim lens assembly 2 of the second embodiment at least satisfies one of the following conditions:

$$0<(f2_1+f2_3)/(f2_2+f2_4)<10 \tag{9}$$

$$f2_{234}>0 \tag{10}$$

$$0<f2_{234}<30 \tag{11}$$

$$0<f2_{234}/f2_4<1 \tag{12}$$

$$0.3<SL2/TTL2<0.8 \tag{13}$$

$$0.3<SL2/TTL2<0.65 \tag{14}$$

$$R2_{12}/f2_1<0 \tag{15}$$

$$-30<R2_{12}/f2_1<0 \tag{16}$$

Wherein the focal length of the first lens L21 is $f2_1$, the focal length of the second lens L22 is $f2_2$, the focal length of the third lens L23 is $f2_3$, the focal length of the fourth lens L24 is $f2_4$. A composite focal length of the second lens element, the third lens element and the fourth lens element is $f2_{23}a$. An electronic sensor on which an object is imaged, wherein a distance on the optical axis OA2 between the stop ST2 and the electronic sensor is SL2, the distance on the optical axis OA2 between the object-side surface of the first lens L21 and the electronic sensor is TTL2. The radius of curvature of the image-side surface S22 of the first lens L21 is $R2_{12}$.

By the above design of the lenses, the stop ST2 and at least satisfies one conditions, the slim lens assembly 2 is provided with a shortened total lens length, an effectively corrected aberration, an increased resolution and resist environmental temperature changes.

The slim lens assembly 2 in accordance with the FIG. 3 is provided with the optical specifications shown in Table 3. Table 3 shows that the effective focal length is equal to 9.673 mm, F-number is equal to 3.6 and total lens length is equal to 13.7974 mm and diagonal field of view is equal to 27 degrees for the slim lens assembly 2 of the second embodiment of the invention.

TABLE 3

| Surface Number | Radius of Curvature (mm) | Thickness (mm) | Nd | Vd | Remark |
| --- | --- | --- | --- | --- | --- |
| S21 | 23.01966 | 1.19509 | 1.54 | 56 | The First Lens L21 |
| S22 | −33.7164 | 0.978599 | | | |
| S23 | 3.416263 | 1.585767 | 1.65 | 20 | The Second Lens L22 |
| S24 | 3.361017 | 1.184289 | | | |
| S25 | −4.70465 | 1.268272 | 1.8466 | 23.78 | The Third Lens L23 |
| S26 | −4.84616 | 0.624899 | | | |
| S27 | ∞ | 1.097398 | | | Stop ST2 |
| S28 | 5.200945 | 1.656367 | 1.65 | 20 | The fourth L24 |
| S29 | 6.324443 | 2.518773 | | | |
| S210 | ∞ | 0.7 | 1.5168 | 64.16734 | Optical Filter OF2 |
| S211 | ∞ | 1 | | | |

The aspheric surface sag z of each lens in table 3 can be calculated by the following formula:

$$z=ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C, and D are aspheric coefficients.

In the second embodiment, the conic constant k and the aspheric coefficients A, B, C, and D of each surface are shown in Table 4.

TABLE 4

| Surface Number | k | A | B | C | D |
| --- | --- | --- | --- | --- | --- |
| S21 | 1.041917 | −5.82778E−05 | 8.79154E−06 | −2.66478E−06 | 5.52963E−08 |
| S22 | 2.785012 | 0.000162054 | 2.71115E−06 | −4.69008E−06 | 1.89375E−07 |

TABLE 4-continued

| Surface Number | k | A | B | C | D |
|---|---|---|---|---|---|
| S23 | −0.00315 | −2.95215E−05 | −1.26214E−06 | −7.53399E−08 | −1.0066E−07 |
| S24 | 0.027592 | 0.000120731 | 3.63643E−05 | 1.32842E−05 | 7.17386E−06 |
| S28 | 0 | −0.001068553 | −0.000520893 | −0.00015104 | 0.000107632 |
| S29 | −0.13768 | −0.000686307 | −0.000218247 | −5.19064E−05 | 7.04294E−06 |

Table 5 lists some parameter and calculated values of the above condition (9)-(16). According to the Table 5, the slim lens assembly 2 of the second embodiment satisfies the above conditions (9)-(16).

TABLE 5

| parameter | calculated values |
|---|---|
| $f2_1$ | 25.638 mm |
| $f2_2$ | 31.78 mm |
| $f2_3$ | 64.296 mm |
| $f2_4$ | 29.003 mm |
| SL2 | 6.97 mm |
| TTL2 | 13.7974 mm |
| $R2_{12}$ | −33.7164 mm |
| $f2_{234}$ | 14.0681 mm |
| $(f2_1 + f2_3)/(f2_2 + f2_4)$ | 1.4796 |
| $f2_{234}/f2_4$ | 0.485 |
| SL2/TTL2 | 0.505 |
| $R2_{12}/f2_1$ | −1.3151 |

Figure 4A:
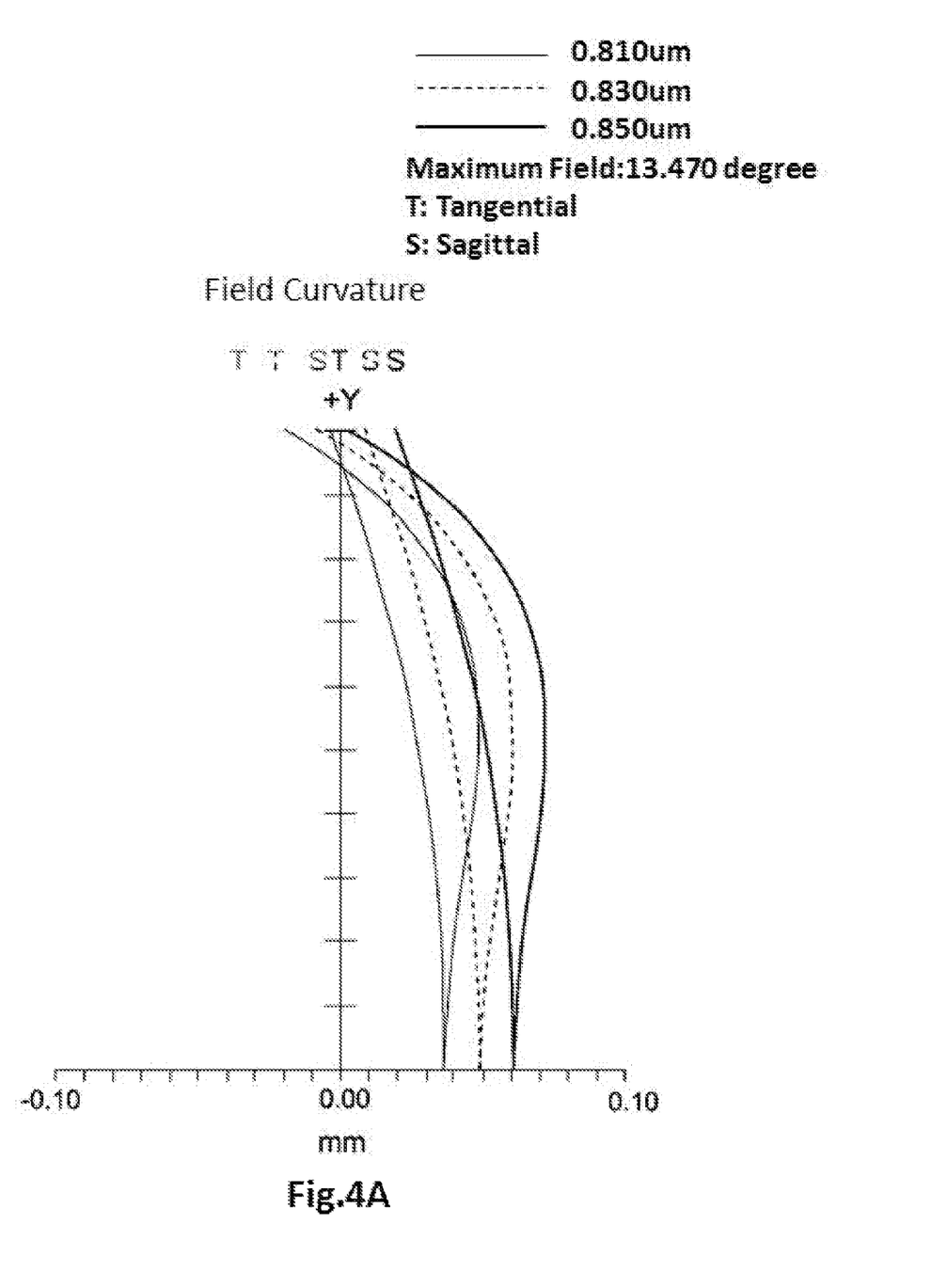
FIG. 4A is a field curvature diagram of the slim lens assembly in accordance with the second embodiment of the invention.
Figure 4B:
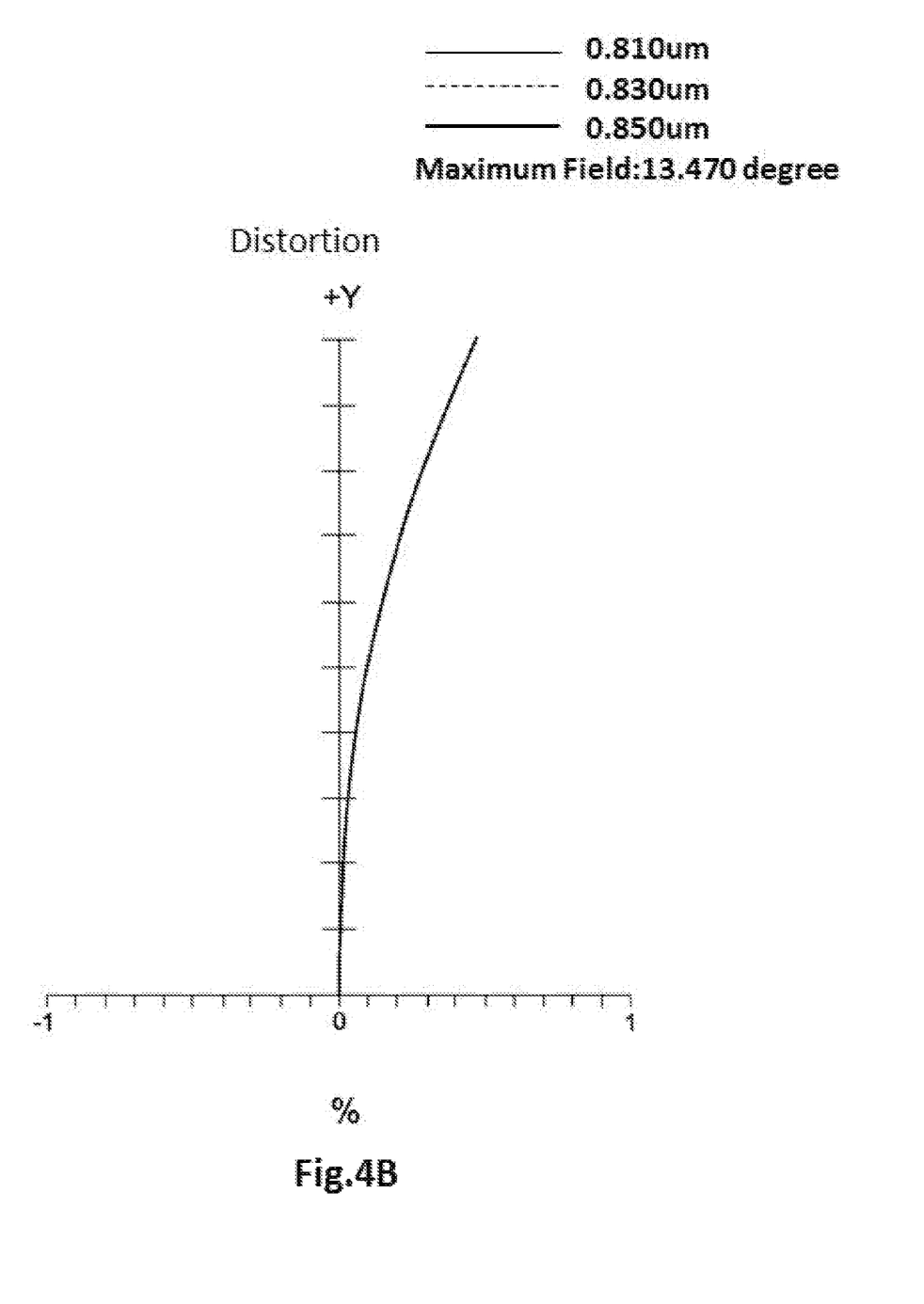
FIG. 4B is a distortion diagram of the slim lens assembly in accordance with the second embodiment of the invention.
Figure 4C:
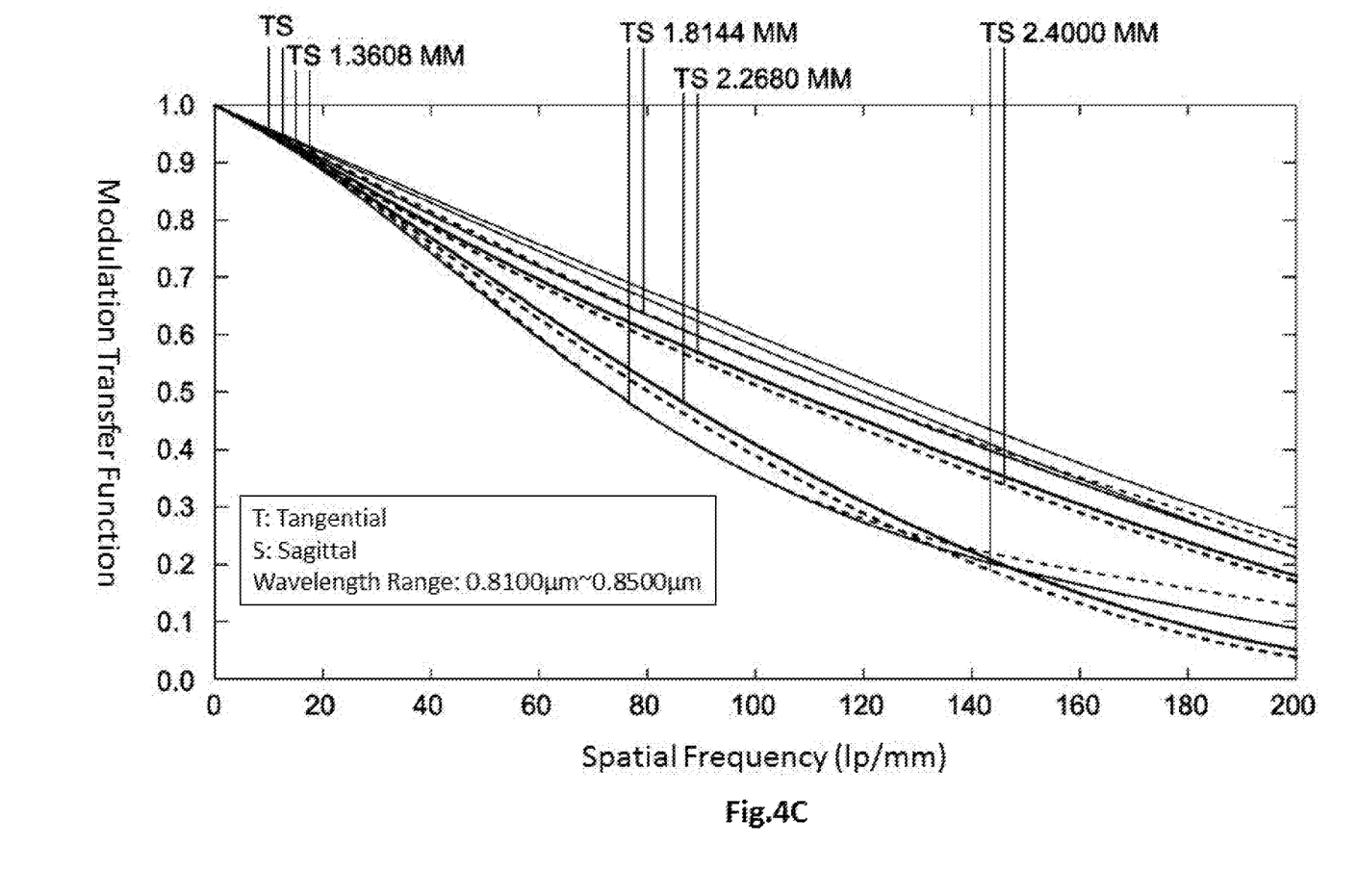
FIG. 4C is a modulation transfer function diagram of the slim lens assembly in accordance with the second embodiment of the invention.

The second embodiment can meet the requirements of optical performance as seen in FIGS. 4A-4C, wherein FIG. 4A shows the field curvature diagram of the slim lens assembly 2 in accordance with the second embodiment of the invention, FIG. 4B shows a distortion diagram of the slim lens assembly 2 in accordance with the second embodiment of the invention, FIG. 4C shows a modulation transfer function diagram of the slim lens assembly 2 in accordance with the second embodiment of the invention.

It can be seen from FIG. 4A that the field curvature of tangential direction and sagittal direction in the slim lens assembly 2 of the second embodiment ranges between −0.02 mm and 0.08 mm for the wavelength of 0.810 μm, 0.830 μm, 0.850 μm.

It can be seen from FIG. 4B (the three lines in the figure almost coincide to appear as if a signal line) that the distortion in the slim lens assembly 2 of the second embodiment ranges between 0% and 0.5% for the wavelength of 0.810 μm, 0.830 μm, 0.850 μm.

It can be seen from FIG. 4C that the modulation transfer function of tangential direction and sagittal direction in the slim lens assembly 2 of the second embodiment ranges from 0.03 to 1.0 wherein the wavelength ranges from 0.81 μm to 0.85 μm; the fields respectively are 1.3608 mm, 1.8144 mm, 2.2680 mm and 2.4000 mm, the spatial frequency ranges from 0 lp/mm to 200 lp/mm.

It is obvious that the field curvature and the distortion of the slim lens assembly 2 of the second embodiment can be corrected effectively, the lens resolution can meet the requirement. Therefore, the slim lens assembly 2 of the second embodiment is capable of good optical performance.

In the above embodiments, the third lens is made of glass material. However, it has the same effect and falls into the scope of the invention that there is made of plastic material.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A slim lens assembly comprising, in order from an object side to an image side along an optical axis:
    a first lens with positive refractive power, which includes a convex surface facing the image side;
    a second lens with positive refractive power, which includes a concave surface facing the image side;
    a third lens with positive refractive power, which includes a concave surface facing the object side and a convex surface facing the image side; and
    a fourth lens with positive refractive power, which includes a concave surface facing the image side.

2. The slim lens assembly according to claim 1 further comprising a stop disposed between the third lens and the fourth lens.

3. The slim lens assembly according to claim 2 further comprising an electronic sensor on which an object is imaged, wherein a distance on the optical axis between the stop and the electronic sensor is SL, a distance on the optical axis between the object-side surface of the first lens and the electronic sensor is TTL, and they satisfy the relation: 0.3<SL/TTL<0.8.

4. The slim lens assembly according to claim 2, wherein a composite focal length of the second lens element, the third element and the fourth element is $f_{234}$, the focal length of the first lens element is $f_1$, the focal length of the second lens element is $f_2$, the focal length of the third lens element is $f_3$, the focal length of the fourth lens element is $f_4$, a radius of curvature of the image-side surface of the first lens is $R_{12}$ and they satisfy the relations: $0<f_{234}/f_4<1$, $0<(f_1+f_3)/(f_2+f_4)<10$, $R_{12}/f_1<0$.

5. The slim lens assembly according to claim 1, wherein the first lens comprises a convex surface facing the object side.

6. The slim lens assembly according to claim 5, wherein the fourth lens comprises a convex surface facing the object side and a concave surface facing the image side.

7. The slim lens assembly according to claim 5, wherein a composite focal length of the second lens element, the third element and the fourth element is $f_{234}$, the focal length of the first lens element is $f_1$, the focal length of the second lens element is $f_2$, the focal length of the third lens element is $f_3$, the focal length of the fourth lens element is $f_4$, a radius of curvature of the image-side surface of the first lens is $R_{12}$ and they satisfy the relations: $0<f_{234}/f_4<1$, $0<(f_1+f_3)/(f_2+f_4)<10$, $R_{12}/f_1<0$.

8. The slim lens assembly according to claim 1, wherein a composite focal length of the second lens element, the third element and the fourth element is $f_{234}$, the focal length of the first lens element is $f_1$, the focal length of the second lens element is $f_2$, the focal length of the third lens element is $f_3$, the focal length of the fourth lens element is $f_4$, a radius of curvature of the image-side surface of the first lens is $R_{12}$ and they satisfy the relations: $0<f_{234}/f_4<1$, $0<(f_1+f_3)/(f_2+f_4)<10$, $R_{12}/f_1<0$.

9. The slim lens assembly according to claim 1, wherein the fourth lens comprises a convex surface facing the object side.

10. A slim lens assembly comprising, in order from an object side to an image side along an optical axis:
- a first lens with positive refractive power, which includes a convex surface facing the image side;
- a second lens with positive refractive power, which includes a convex surface facing the object side and a concave surface facing the image side;
- a third lens with positive refractive power, which includes a concave surface facing the object side and a convex surface facing the image side;
- a stop; and
- a fourth lens with positive refractive power.

11. The slim lens assembly according to claim 10, wherein the first lens includes a convex surface facing the object side, a composite focal length of the second lens element, the third lens element and the fourth lens element is $f_{234}$, and the following condition is satisfied: $f_{234}>0$.

12. The slim lens assembly according to claim 11, wherein the fourth lens comprises a convex surface facing the object side and a concave surface facing the image side.

13. The slim lens assembly according to claim 11 further comprising an electronic sensor on which an object is imaged, wherein a distance on the optical axis between the stop and the electronic sensor is SL, a distance on the optical axis between the object-side surface of the first lens and the electronic sensor is TTL, and they satisfy the relation: $0.3<SL/TTL<0.8$.

14. The slim lens assembly according to claim 11, wherein a composite focal length of the second lens element, the third element and the fourth element is $f_{234}$, the focal length of the first lens element is $f_1$, the focal length of the second lens element is $f_2$, the focal length of the third lens element is $f_3$, the focal length of the fourth lens element is $f_4$, a radius of curvature of the image-side surface of the first lens is $R_{12}$ and they satisfy the relations: $0<f_{234}/f_4<1$, $0<(f_1+f_3)/(f_2+f_4)<10$, $R_{12}/f_1<0$.

15. The slim lens assembly according to claim 10, wherein the fourth lens comprises a convex surface facing the object side and a concave surface facing the image side.

16. The slim lens assembly according to claim 10 further comprising an electronic sensor on which an object is imaged, wherein a distance on the optical axis between the stop and the electronic sensor is SL, a distance on the optical axis between the object-side surface of the first lens and the electronic sensor is TTL, and they satisfy the relation: $0.3<SL/TTL<0.8$.

17. The slim lens assembly according to claim 10, wherein a composite focal length of the second lens element, the third element and the fourth element is $f_{234}$, the focal length of the first lens element is $f_1$, the focal length of the second lens element is $f_2$, the focal length of the third lens element is $f_3$, the focal length of the fourth lens element is $f_4$, a radius of curvature of the image-side surface of the first lens is $R_{12}$ and they satisfy the relations: $0<f_{234}/f_4<1$, $0<(f_1+f_3)/(f_2+f_4)<10$, $R_{12}/f_1<0$.

18. A slim lens assembly comprising, in order from an object side to an image side along an optical axis:
- a first lens with positive refractive power, which includes a convex surface facing the image side;
- a second lens with positive refractive power, which includes a concave surface facing the image side;
- a third lens with positive refractive power, which includes a concave surface facing the object side and a convex surface facing the image side;
- a stop; and
- a fourth lens with positive refractive power.

19. The slim lens assembly according to claim 18, wherein the fourth lens comprises a convex surface facing the object side and a concave surface facing the image side.

20. The slim lens assembly according to claim 18, wherein the first lens includes a convex surface facing the object side, a composite focal length of the second lens element, the third lens element and the fourth lens element is $f_{234}$, and the following condition is satisfied: $f_{234}>0$.

* * * * *